April 14, 1925.

E. W. EHN

QUENCHING APPARATUS

Filed July 11, 1924    2 Sheets-Sheet 1

1,533,639

INVENTOR:
Erik W. Ehn,
by
HIS ATTORNEYS.

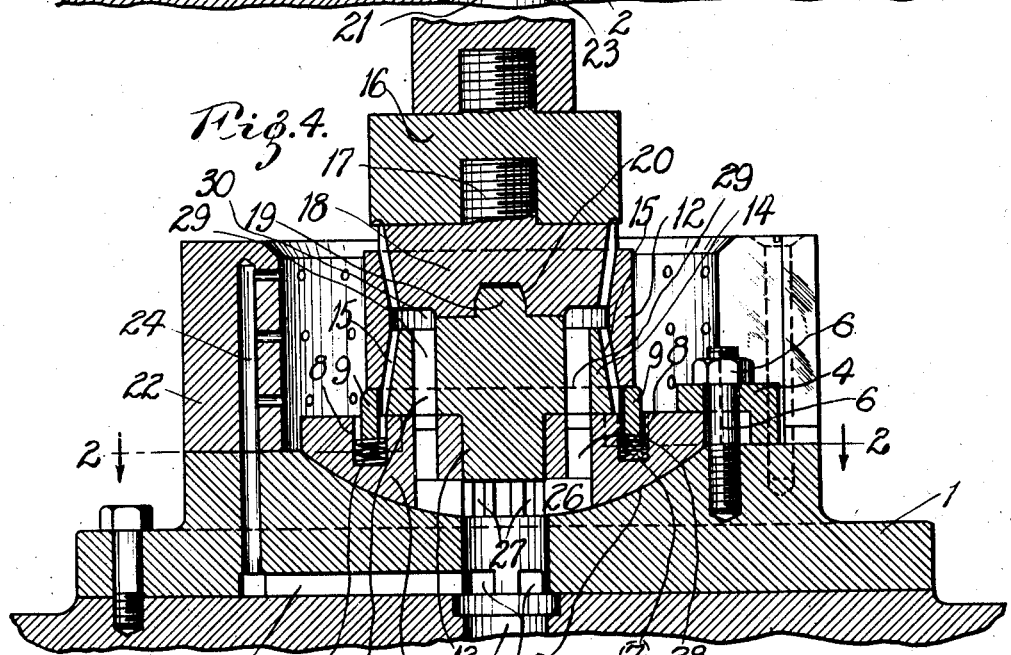

Patented Apr. 14, 1925.

1,533,639

UNITED STATES PATENT OFFICE.

ERIK W. EHN, OF CANTON, OHIO, ASSIGNOR TO THE TIMKEN ROLLER BEARING COMPANY, OF CANTON, OHIO, A CORPORATION OF OHIO.

QUENCHING APPARATUS.

Application filed July 11, 1924. Serial No. 725,407.

*To all whom it may concern:*

Be it known that I, ERIK W. EHN, a subject of the King of Sweden, and a resident of the city of Canton, in the county of Stark and State of Ohio, have invented a new and useful Improvement in Quenching Apparatus, of which the following is a specification.

My invention relates to quenching apparatus, particularly to plugs adapted to be used in quenching double conical cups of roller bearings and has for its principal object an apparatus by which such cups may be easily and economically hardened and the two conical surfaces thereof be maintained concentric and properly alined during the hardening operation and each conical surface be kept truly circular in section. The invention consists principally in a two-part hardening plug, the lower part being adapted to receive one tapered bore of a double conical cup for roller bearings or the like, the upper plug being adapted to be inserted into the other tapered bore of the cup and one part being provided with a projection and the other with a cooperating depression, whereby the two parts of the plug are accurately alined and centered with respect to each other. The invention further consists in the hardening plug and quenching apparatus and in the parts and combinations of parts hereinafter described and claimed.

In the accompanying drawings which form part of this specification and wherein like reference numerals refer to like parts in the several views, Fig. 1 is a top plan view of a quenching apparatus embodying my invention;

Fig. 3 is an elevation, certain parts being broken away and shown in section; and Fig. 4 is a vertical sectional view on the line 4—4 in Fig. 1.

Figure 1:
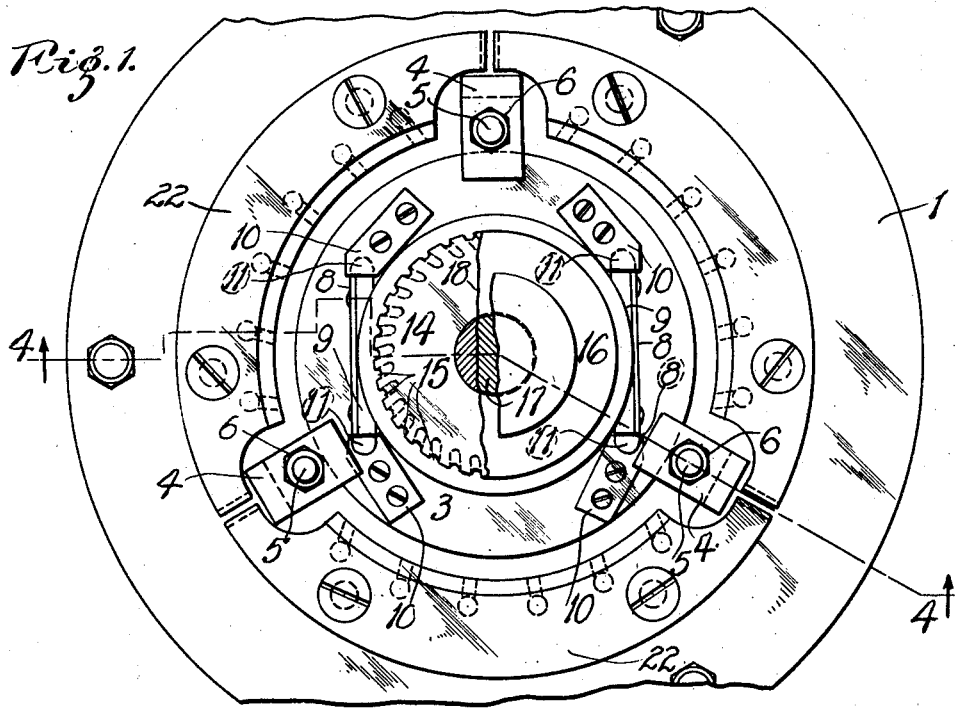
Figure 2:
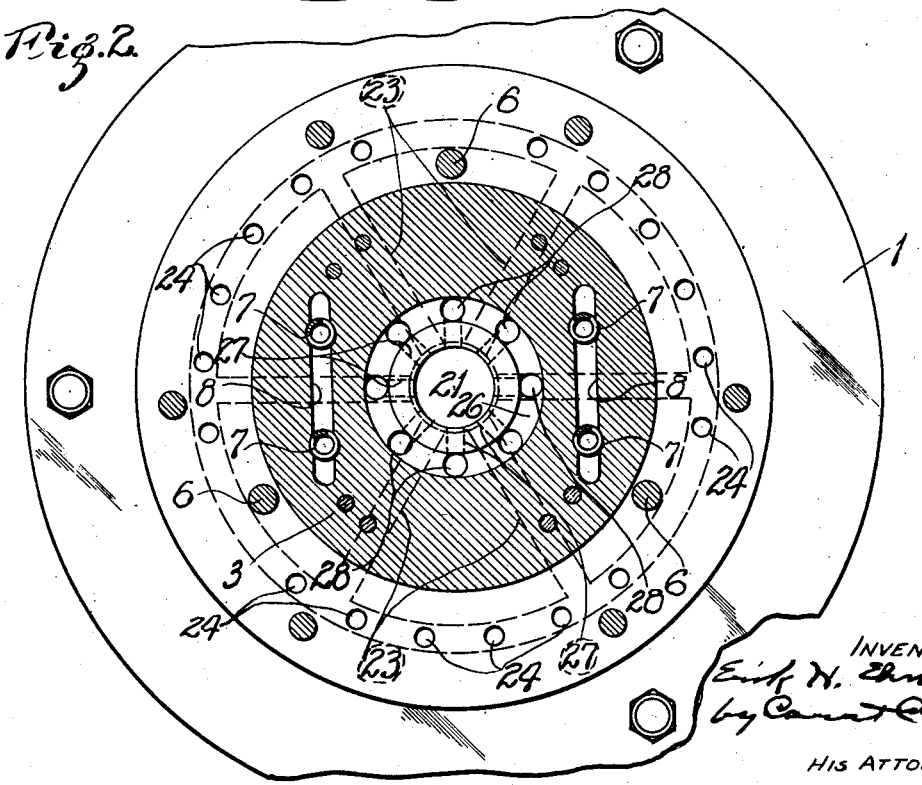
Fig. 2 is a horizontal sectional view along the line 2—2 in Fig. 4.

A suitable base member 1 has a concave depression 2 therein, in which is mounted a convexly curved plate 3. Said plate 3 is secured in position by means of clamps 4 that are secured to the base by bolts 5 and nuts 6.

Disposed on springs 7 near the ends of slots 8 in the plate 3 are bars 9 or work supports that are held in the slots 8 by means of stop pieces 10 screwed to the plate at the ends of each slot 8 and adapted to engage lugs 11 projecting from the lower ends of said bars 9. The cup 12 to be quenched rests on said bars.

Threaded into a threaded hole in the plate 3 is the stem 13 of a plug 14 having a conical surface adapted to fit one conical bore of a double conical cup 12 for roller bearings. The conical surface of the plug is provided with inclined or spirally disposed flutes 15 whereby the cup is supported at spaced points and the circularity thereof maintained, while at the same time the quenching fluid is permitted access to a very large portion of the surface of the cup.

Threaded into the lower end of a suitable reciprocating ram 16 is the stem 17 of an upper plug 18 that is provided with a conical surface adapted to fit the other conical bore of the double conical bearing cup 12. The conical surface of the upper plugs is likewise provided with inclined or spirally disposed flutes 15.

The lower plug 14 is provided with an upstanding boss 19 and the upper plug 18 is provided with a cooperating recess 20 that snugly fits said boss, so that the two plugs are accurately alined and centered.

The base member 1 is provided with a central opening 21 that is adapted to receive a suitable quenching liquid. Mounted on the base member 1 is an annular side member 22 that forms the side walls of a quenching chamber. The base member 1 has a plurality of radiating passageways 23 that communicate with upwardly extending passageways 24 in the base member and in the side member. Transverse passageways 25 communicate with the vertical passageways 24 of the side member 22 and are adapted to spray the outer surface of a cup 12 being quenched.

The plate 3 is provided with a central passageway 26 that communicates with the passageway 21 of the base. Opening from said central passageway 26 are radiating passageways 27 that communicate with upwardly extending passageways 28, which, in turn, communicate with passageways 29 extending through the lower plug. The outer marginal portions of the plugs are spaced from each other, thereby forming an annular passageway 30 for hardening liquid between the two plugs, which passageway communicates with the passageways between the flutes 15 of the upper and lower plugs.

The operation of the above apparatus is as follows:

A heated cup 12 is placed over the lower plug 14, resting on the two work supporting bars 9, which are held in raised position by the springs 7. The ram 16 is then lowered and the upper plug 18 enters the upper conical bore of the cup 12, forcing said cup downwardly onto the lower plug 14. The recess 20 of the upper plug 18 slips over the boss 19 of the lower plug 14, thus alining and centering the two plugs. Suitable mechanism (not shown in the drawings) is provided whereby the downward movement of the upper plug 18 starts the flow of the quenching liquid into the central passageway 21 of the base, whence it flows through the passageways of the base and side member and is forced against the outer surface of the cup. Quenching liquid also flows through the radiating passageways 27 and the vertical passageways 28 of the plate and the passageways 29 of the lower plug into the annular passageway 30 between the two plugs 14 and 18, whence part of the liquid flows upwardly between the flutes 15 of the upper plug and part downwardly between the flutes 15 of the lower plug, thus quenching both conical surfaces of the cup.

The quenching apparatus herein described is simple and economical. The circularity of the two conical surfaces of the cup is accurately maintained and said surfaces are accurately centered and alined with respect to each other. Obviously, numerous changes may be made without departing from the invention and I do not wish to be limited to the precise construction shown.

What I claim is:

1. A hardening device comprising a plate, a plug thereon adapted to fit the conical bore of a conical cup for roller bearings and the like and spring-pressed bars on either side of said plug for supporting the cup.

2. A hardening device comprising a base, a plate thereon, an annular member on said base surrounding said plate, a plug on said plate adapted to fit one conical bore of a double conical cup for roller bearings, spring-pressed bars in said plate for supporting said cup, and a second plug adapted to fit the other bore of said cup and to be pressed thereinto to force said cup onto said first plug.

3. A hardening device comprising a base, a plate thereon, an annular member on said base surrounding said plate, a plug on said plate adapted to fit one conical bore of a double conical cup for roller bearings, spring pressed bars in said plate for supporting said cup, a second plug adapted to fit the other bore of said cup and to be pressed thereinto to force said cup onto said first plug and passageways for quenching liquid through said base, annular member and first plug whereby the cup may be quenched.

4. A hardening device comprising a base, a plate thereon, an annular member on said base surrounding said plate, a plug on said plate adapted to fit one conical bore of a double conical cup for roller bearings, spring-pressed bars in said plate for supporting said cup, a second plug adapted to fit the other bore of said cup and to be pressed thereinto to force said cup onto said first plug, and means for quenching the outer surface and the conical bores of said cup.

5. A hardening device comprising a base, a plate thereon, an annular member on said base surrounding said plate, a fluted plug on said plate adapted to fit one conical bore of a double conical cup for roller bearings, spring-pressed bars in said plate for supporting said cup, a second fluted plug adapted to fit the other bore of said cup and to be pressed thereinto to force said cup onto said first plug and passageways for quenching liquid through said base, annular member and first plug, there being a space between said plugs around their peripheries, the spaces between the flutes of the plugs opening into said space and the passageways of said lower plug opening into said space.

6. A hardening device comprising a base, a plate thereon, an annular member on said base surrounding said plate, a plug on said plate adapted to fit one conical bore of a double conical cup for roller bearings, said plate having means for supporting said cup, and a second plug adapted to fit the other bore of said cup and to be pressed thereinto to force said cup onto said first plug.

7. A hardening device comprising a base, a plate thereon, an annular member on said base surrounding said plate, a plug on said plate adapted to fit one conical bore of a double conical cup for roller bearings, said plate having means for supporting said cup, a second plug adapted to fit the other bore of said cup and to be pressed thereinto to force said cup onto said first plug and passageways through said base, annular member and first plug whereby the cup may be quenched.

8. A hardening device comprising a base, a plate thereon, an annular member on said base surrounding said plate, a plug on said plate adapted to fit one conical bore of a double conical cup for roller bearings, said plate having means for supporting said cup, and a second plug adapted to fit the other bore of said cup and to be pressed thereinto to force said cup onto said first plug, one of said plugs being provided with a depression, and the other plug being provided with a mating projection.

9. A hardening device comprising a base, a plate thereon, an annular member on said base surrounding said plate, a plug on said plate adapted to fit one conical bore of a double conical cup for roller bearings, said plate having means for supporting said cup, and a second plug adapted to fit the other bore of said cup and to be pressed thereinto to force said cup onto said first plug, one of said plugs being provided with a depression, and the other plug being provided with a mating projection, said depression and said projection having cooperating conical portions.

Signed at Canton, Ohio, this 5th day of July 1924.

ERIK W. EHN.